(12) United States Patent
Wilkerson et al.

(10) Patent No.: US 12,479,601 B2
(45) Date of Patent: Nov. 25, 2025

(54) STAND FOR HOLDING A WORKPIECE WITH THREE-AXIS ADJUSTABILITY

(71) Applicant: Government of the United States as represented by the Secretary of the Air Force, Wright-Patterson AFB, OH (US)

(72) Inventors: Kimberly Wilkerson, Midwest City, OK (US); Juan Soto, Oklahoma City, OK (US); Casey Johnson, Oklahoma City, OK (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 0 days.

(21) Appl. No.: 18/667,181

(22) Filed: May 17, 2024

(65) Prior Publication Data
US 2025/0353614 A1    Nov. 20, 2025

(51) Int. Cl.
*B64F 5/50* (2017.01)

(52) U.S. Cl.
CPC ..................... *B64F 5/50* (2017.01)

(58) Field of Classification Search
CPC .................................................. B64F 5/10
See application file for complete search history.

(56) References Cited

U.S. PATENT DOCUMENTS

| | | | |
|---|---|---|---|
| 3,643,900 A | | 2/1972 | Maloney |
| 3,884,363 A | * | 5/1975 | Ajlouny ................ B65G 61/00 414/626 |
| 4,133,514 A | | 1/1979 | Anderson |
| 4,781,517 A | * | 11/1988 | Pearce .................... B25J 18/02 104/167 |
| 4,836,111 A | * | 6/1989 | Kaufmann .............. B25J 9/026 104/247 |
| 4,894,903 A | | 1/1990 | Woods |
| 4,995,146 A | | 2/1991 | Woods |
| 5,199,147 A | | 4/1993 | Whiteside |
| 5,604,974 A | | 2/1997 | Roberts |
| 5,836,068 A | * | 11/1998 | Bullen ................... B23Q 17/24 29/430 |
| 6,009,916 A | * | 1/2000 | Krumm .................... D03C 7/04 139/54 |
| 6,308,550 B1 | * | 10/2001 | Papesh .................... B21D 1/14 72/305 |
| 7,574,933 B2 | | 8/2009 | Hazelhurst |

(Continued)

*Primary Examiner* — Kyle A Cook
(74) *Attorney, Agent, or Firm* — AFMCLO/JAZ; Larry L. Huston

(57) ABSTRACT

A stand for holding an aircraft workpiece during maintenance. The stand has a pair of longitudinally spaced apart uprights, an elongate, longitudinal, vertically placeable spine connecting the pair of uprights, an elongate, transversely oriented, longitudinally placeable spreader disposed on the first spine and at least one transversely placeable slider disposed on the first spine spreader. At least one fixture is disposed on each slider. The fixture is adapted to hold a removably workpiece in fixed relationship relative to an operator. The uprights, spines and spreaders provide three-axis vertical, longitudinal and transverse placement of the fixture, respectively.

17 Claims, 19 Drawing Sheets

(56) References Cited

U.S. PATENT DOCUMENTS

| | | | |
|---|---|---|---|
| 8,122,834 B2* | 2/2012 | Kato | B25J 9/026 |
| | | | 104/93 |
| 9,708,079 B2* | 7/2017 | DesJardien | B66C 5/02 |
| 9,730,513 B2 | 8/2017 | Udagawa | |
| 10,052,744 B2 | 8/2018 | Hacker | |
| 11,235,432 B2 | 2/2022 | DesJardien | |
| 11,247,787 B1* | 2/2022 | Henderson | F01D 25/285 |
| 11,999,510 B1* | 6/2024 | Henderson | B65B 23/00 |
| 2009/0020369 A1* | 1/2009 | Warachka | B66F 9/08 |
| | | | 187/222 |
| 2011/0214586 A1* | 9/2011 | Wessel | B25J 5/02 |
| | | | 180/125 |
| 2020/0324915 A1* | 10/2020 | Wright | B66F 7/0625 |
| 2023/0364669 A1 | 11/2023 | Oberoi | |
| 2024/0417106 A1* | 12/2024 | Pacaud | B23P 19/10 |

\* cited by examiner

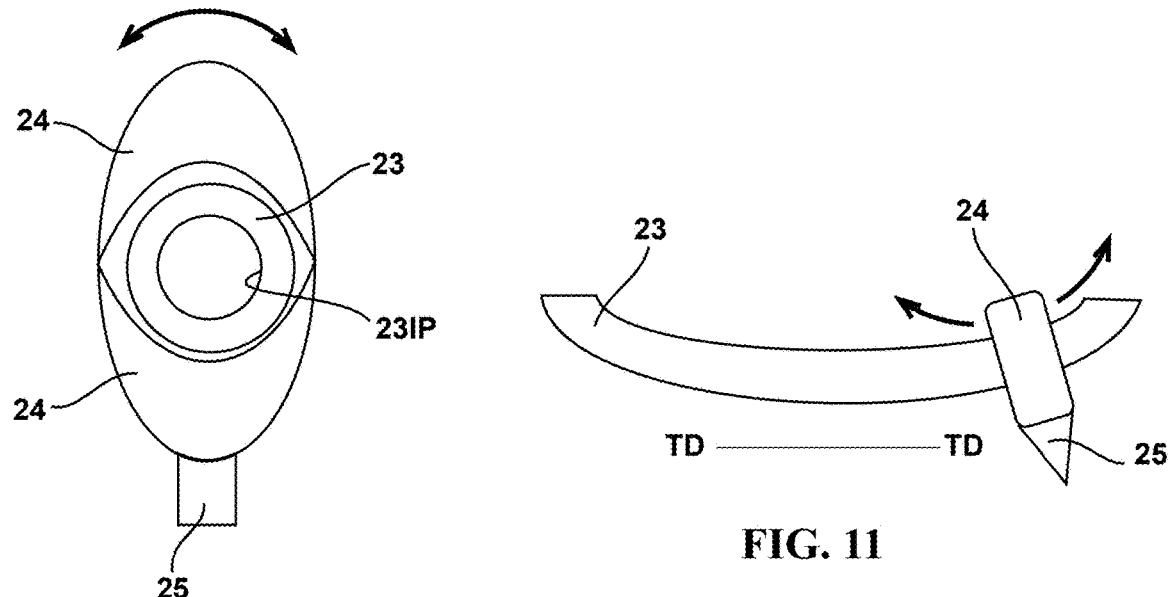
FIG. 10B
FIG. 11
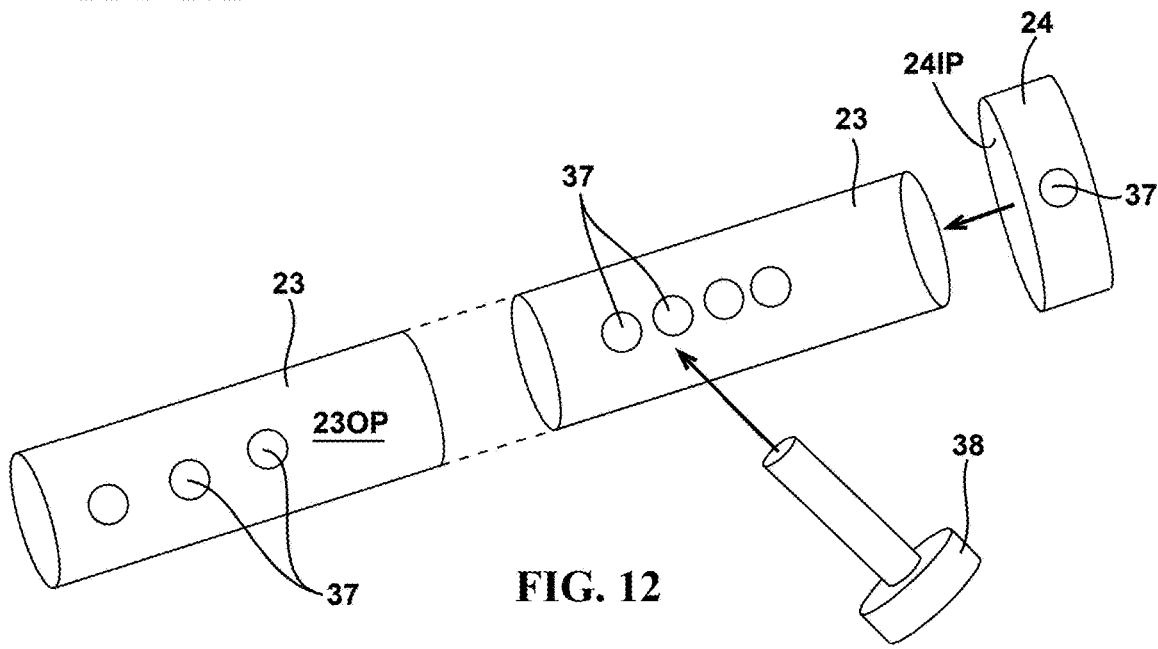
FIG. 12

STAND FOR HOLDING A WORKPIECE WITH THREE-AXIS ADJUSTABILITY

STATEMENT OF GOVERNMENT INTEREST

The invention described and claimed herein may be manufactured, licensed and used by and for the Government of the United States of America for all government purposes without the payment of any royalty.

FIELD OF THE INVENTION

The present invention is related to a stand for holding small to large sized workpieces in various positions for maintenance and more particularly to such a stand having adjustability for the fixtures holding the workpiece in three mutually perpendicular axes.

BACKGROUND OF THE INVENTION

In 1946 the Air Force issued a requirement for a bomber aircraft having an unrefueled range of 8000 miles with a 10,000 pound bomb load and a top speed of 450 mph. That year a preliminary design contract was awarded to the Boeing Company with the first B-52 roll-out on Nov. 29, 1951, the first flight on Apr. 15, 1952 and the last B-52 Stratofortress delivered Oct. 26, 1962. A total of 744 B-52 aircraft were produced between 1952 and 1962. Engineering analyses indicates the expected lifespan of the B-52 extends beyond 2040 and possibly for 100 years.

The B-52H model aircraft has a wingspan of 185 feet, a length of 157 feet and gross weight of 488,000 pounds. The B-52 aircraft have six to seven spoilers asymmetrically usable to help the ailerons with roll control, or symmetrically to act as airbrakes. Clearly, the flight control surfaces are critical to safe and continuing operation of the B-52 aircraft.

A common factor for all B52 aircraft is the need to maintain and restore the flight control surfaces of the wings. Each wing has a length of almost 161 feet, an area of 4000 square feet, a taper ratio of 0.37 and a leading edge sweep of 35 degrees. The flight control surfaces are critical aerodynamic portions of the wings which allow the pilot to adjust and control the aircraft pitch during flight. Since the original B-52 production in the 1950's, time and space constraints require fast turnover for maintenance of tens of thousands of various and irregularly shaped aircraft components. A flight control surface stand for maintaining such flight control surfaces is advantageously disclosed in commonly assigned application Ser. No. 18/341,459 filed Jun. 26, 2023 in the names of Jones et al., the disclosure of which is incorporated herein by reference.

But the military not only has this particular bomber aircraft. The Department of the Air Force has: supply aircraft such as the C-130 Hercules, C-5 Galaxy and C-17 Globemaster; refueling aircraft such as the KC-135 Tanker and E-2D Hawkeye; combat aircraft such as the F-35 Lightening, F-22 Raptor and F-16 Falcon and stealth aircraft such as the B-2 Spirit and the B-21 Raider with deliveries expected in the mid-2020's to name a few.

Each of these aircraft, and more, has hundreds of parts which need to be removed, held in one or more specific positions for inspection, held in yet other positions for restoration, and in yet other positions for qualification before being placed back in service. A single Air Force base may service various aircraft. The specific aircraft to be serviced can vary over time, and even include one-off servicing of a specific aircraft as needed.

Due to space constraints such maintenance often occurs in a single bay of a hangar. I.e. the same hangar bay may support maintenance for a small part from a current generation aircraft in the morning and for a large part from 6th generation aircraft in the afternoon. Furthermore, the required precision for military aircraft components requires resolutions of at least 0.001 inches. In addition to accommodating the almost unlimited variety of aircraft components, the maintenance equipment must be available without the need for external power in austere environments and usable in both stationary and portable configurations.

Various attempts have been made in the art to meet these challenges. For example, U.S. Pat. No. 3,643,900, filed Mar. 2, 1970, teaches a jig panel for use with aircraft wings. U.S. Pat. No. 4,894,903, filed Jul. 6, 1988, teaches a jig for holding wing skin panels. U.S. Pat. No. 4,995,146, filed Oct. 26, 1988, teaches a jig for holding wing spars. U.S. Pat. No. 5,199,147, priority filed Sep. 1, 1990, teaches an assembly jig for aircraft spar components. U.S. Pat. No. 7,574,933, priority filed Oct. 31, 2001, teaches an index system for holding a wing spar.

But none of these various attempts in the art address the long felt need for a stand which can rapidly accommodate the almost limitless various sizes and irregular shapes of tens of thousands of aircraft components from different aircraft as may be encountered on a single day for inspection, maintenance and qualification and of components. Nor do any of these various attempts in the art address the long felt need for a positioning mechanism having infinite adjustability on a support to perform such inspection, maintenance and qualification of aircraft components. The present invention addresses these long felt needs and overcomes the attempts in the prior art.

SUMMARY OF THE INVENTION

In one embodiment the invention comprises a stand for holding at least one aircraft workpiece during maintenance. The stand defines a longitudinal direction, a transverse direction perpendicular thereto and comprises a pair of longitudinally spaced apart uprights, a first elongate, longitudinally oriented, vertically placeable spine operably connecting the pair of uprights, an elongate, transversely oriented, longitudinally placeable first spine spreader translatably disposed on the first spine, at least one transversely placeable slider, the slider being translatably disposed on the first spine spreader and at least one fixture disposed on each at least one slider, each at least one fixture being adapted to hold a removably workpiece in fixed relationship relative to an operator.

BRIEF DESCRIPTION OF THE DRAWINGS

All drawings are to scale except those drawings, or portions thereof, specifically called out as schematic. The aircraft workpiece is schematically shown in phantom throughout various drawings.

FIG. 10B is a schematic sectional view of the alternative embodiment of a round spreader with a slider thereon.

FIG. 11 is a schematic side elevational view of an alternative embodiment having a curvilinear spreader.

FIG. 12 is a schematic perspective view of an alternative embodiment of a spreader and slider having index holes.

DETAILED DESCRIPTION OF THE INVENTION

Figure 1A:
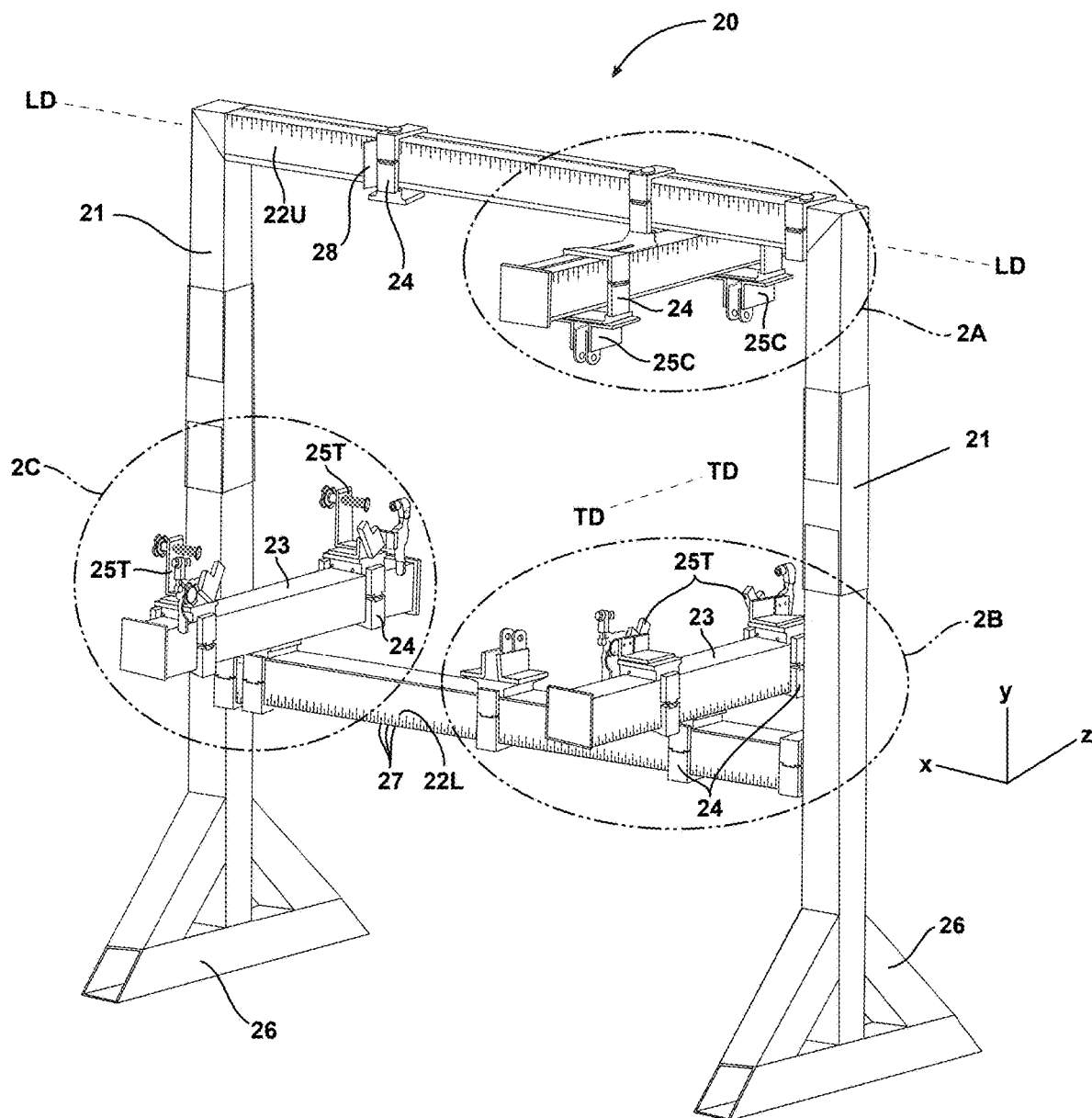
FIG. 1A is a perspective view of a stand according to the present invention.
Figure 1B:
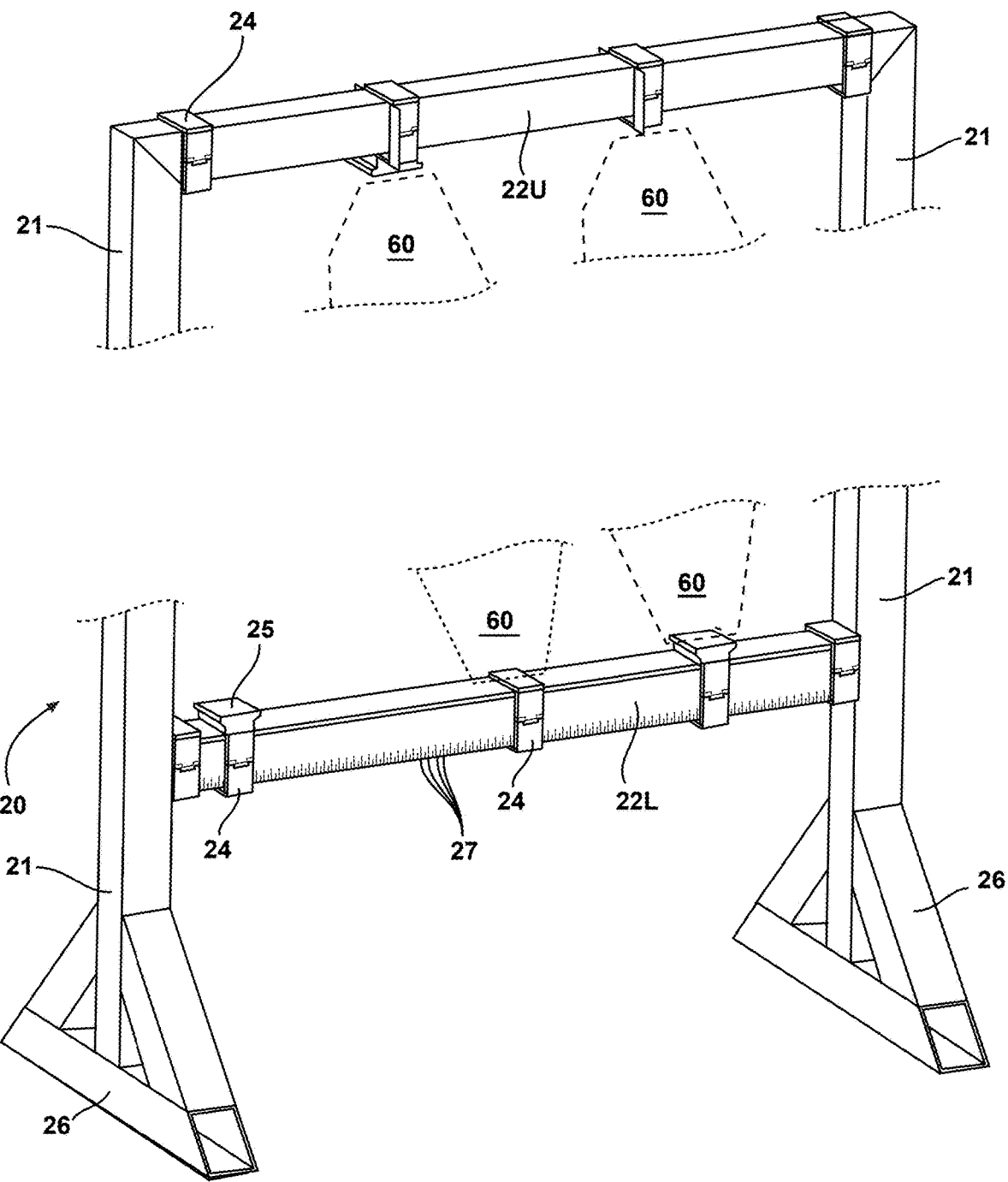
FIG. 1B is a perspective view of a stand according to the present invention having an indeterminate vertical dimension and the spreaders omitted for clarity.
Figure 1C:
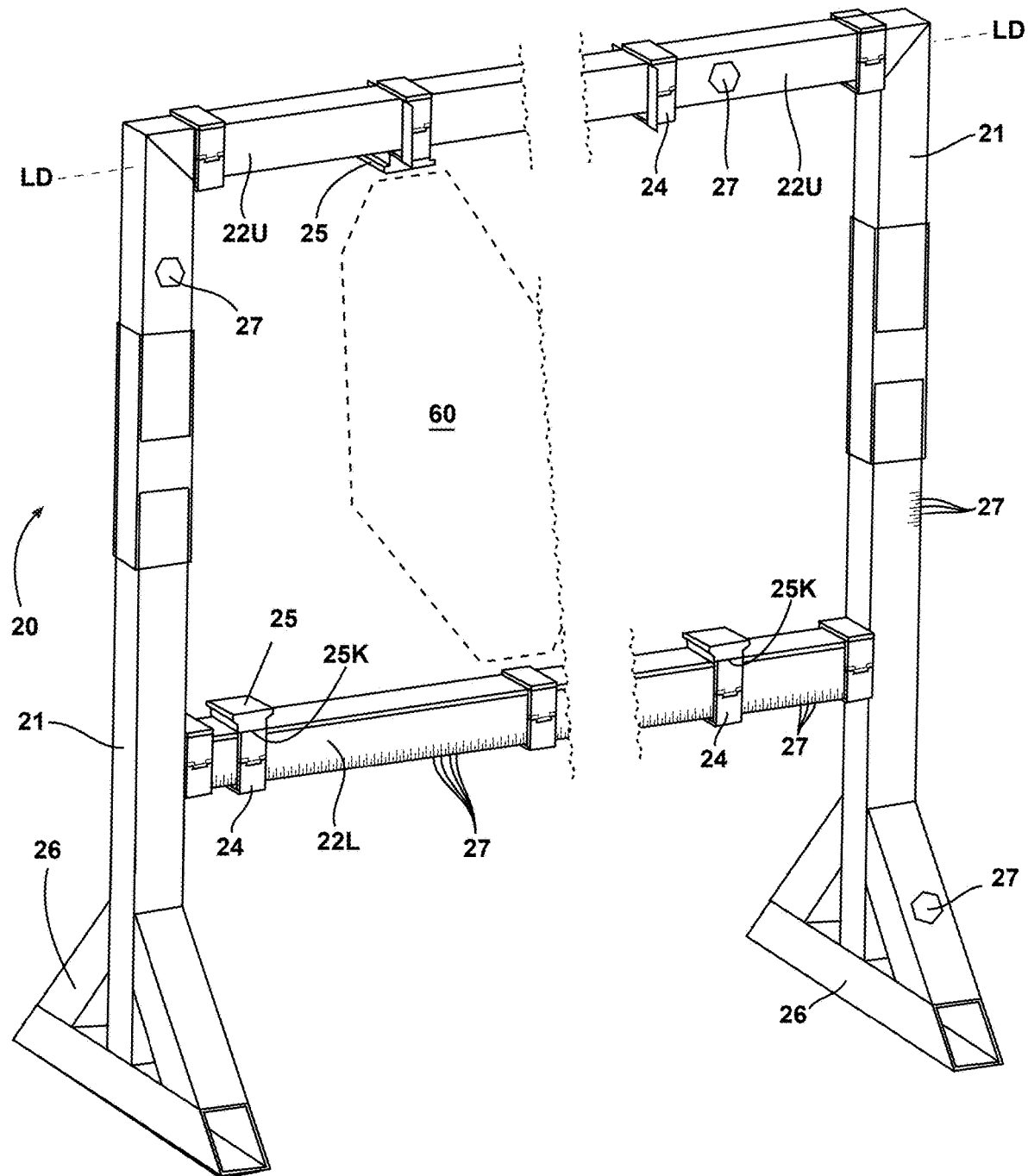
FIG. 1C is a perspective view of a stand according to the present invention having an indeterminate longitudinal dimension and the spreaders omitted for clarity.

Referring to FIG. 1A, FIG. 1B and FIG. 1C, the invention comprises a stand 20 for performing inspection, restoration, qualification, flight readiness and other necessary tasks, collectively referred to as maintenance, on aircraft components removable from and serviceable for flight readiness, hereinafter referred to as aircraft workpieces 60 while on the stand 20 of the present invention. Except as specifically claimed, the aircraft workpiece 60 forms no part of the present invention.

The stand 20 may be considered to define mutually perpendicular X, Y and Z axes, corresponding to the longitudinal direction LD, vertical direction V and transverse direction TD, respectively. The longitudinal direction LD and the transverse direction TD are mutually perpendicular to each other and to the vertical direction V.

The stand 20 of the present invention comprises at least one upright 21 and preferably a pair of uprights 21. The uprights 21 are generally vertically oriented. The stand 20 may be portable and moved to various maintenance bays as required. If so, the uprights 21 may comprise a foot 26 to increase the base area for stability. Alternatively, the uprights 21 may be permanently mounted to a wall or the floor for stationary use.

The uprights 21 are fixedly connected in spaced relationship by a pair of vertically spaced spines 22U, 22L. The spines 22U, 22L are generally horizontally oriented. The upper spine 22U and lower spine 22L may be vertically stacked, with one above the other.

One or more spreaders 23 are fixedly disposed on each spine and may also be generally horizontally oriented. The uprights 21, spines 22 and spreaders 23 are individually and collectively referred to as support bars.

At least one fixture 25 is directly or indirectly disposed on a respective spreader 23 for removably holding an aircraft workpiece 60. By generally vertically oriented it is meant the corresponding feature is oriented within +/−30 degrees of vertical V. By generally horizontally oriented it is meant the corresponding feature is oriented within +/−30 degrees of horizontal. Vertically oriented and horizontally oriented refer to identically vertical V and horizontal directions, respectively.

The spines 22 may have stationary or movable stops 28 affixed thereto. The stops 28 may be disposed as needed to position a respective slider 24 as needed for a particular task. The stops 28 may be disposed on the spreader 23 as convenient, particularly if the the spreader 23 is to be disposed at an elevated or contorted position. The slider 24 then butts against the stop 28 and improper positioning is minimized. Similarly, the stops 28 may be disposed on the spines 22U, 22L for accurate positioning of the spreaders 23 thereon.

The uprights 21, spines 22U, 22L and spreaders 23 are elongate and may be of singular fixed length or variable fixed length as are known in the art. The spines 22U, 22L define a longitudinal direction LD and may be vertically disposed on the uprights 21 in any desired position. The spreaders 23 define a transverse direction TD perpendicular to the longitudinal direction LD and may be disposed in any desired position fixedly attached to the spines 22U, 22L. The spreaders 23 may rest upon or depend from the respective spine 22U, 22L. The spreaders 23 have a spreader 23 inner surface 23IP and a spreader 23 outer surface 23OP opposed thereto.

Figure 2A:
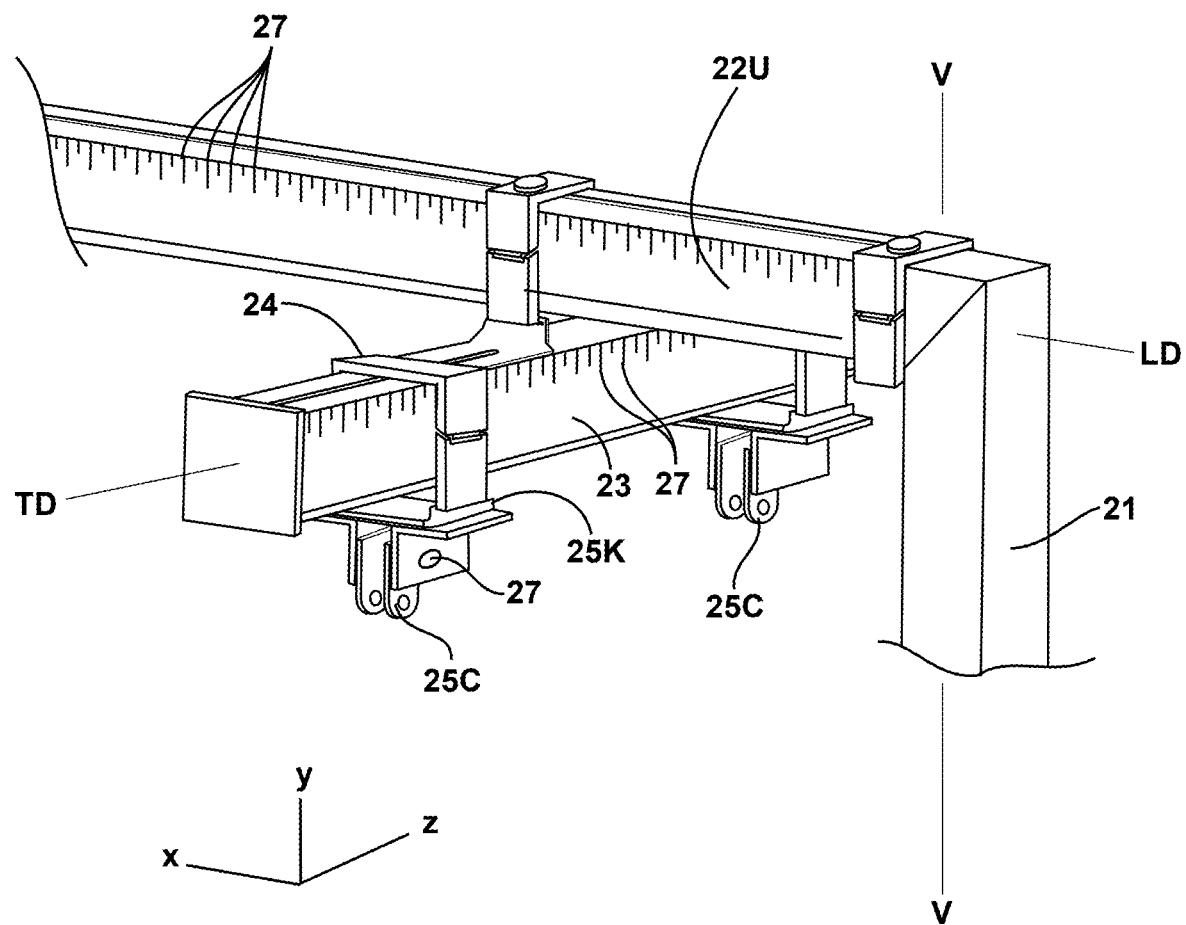
FIG. 2A is an enlarged fragmentary perspective view taken at circle 2A of FIG. 1A.
Figure 2B:
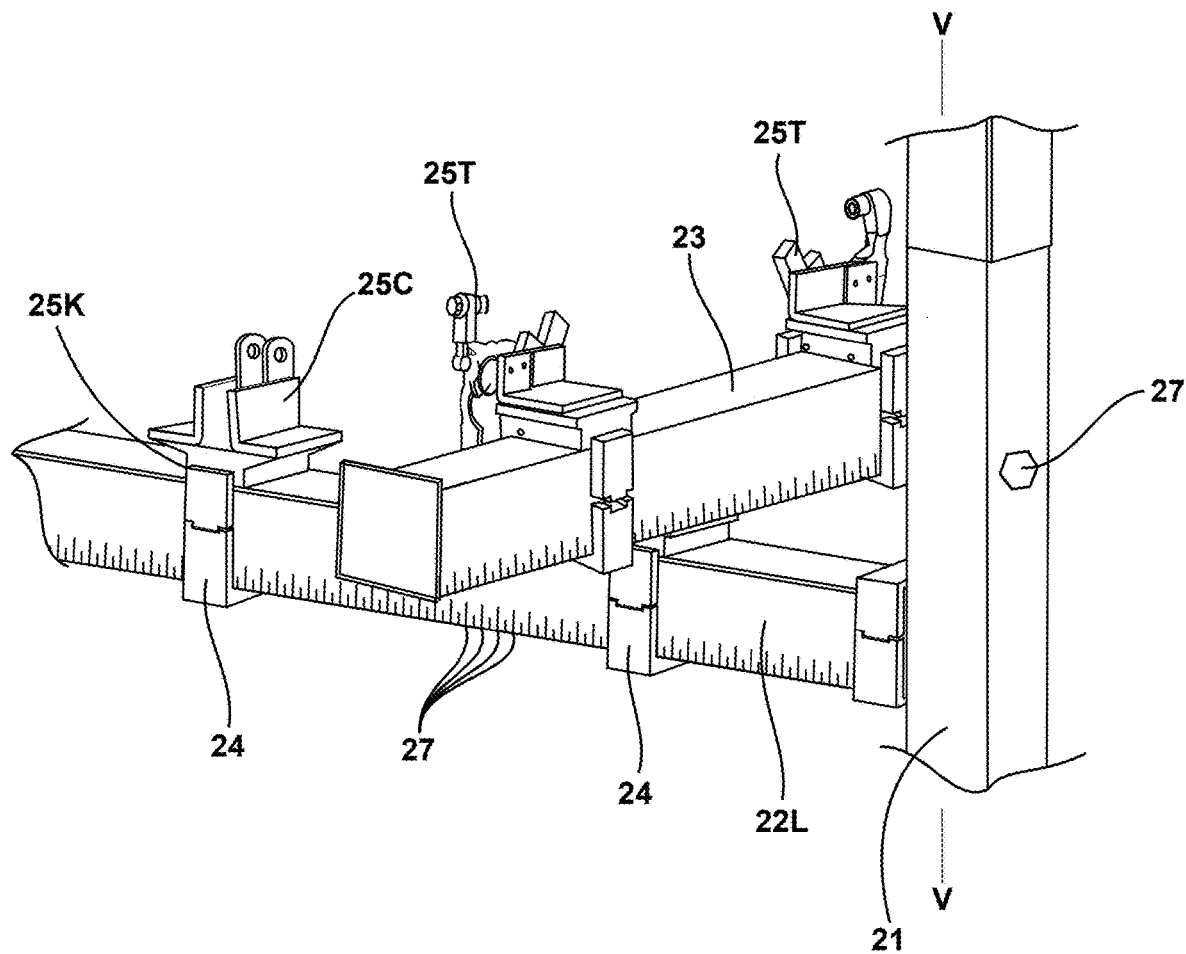
FIG. 2B is an enlarged fragmentary perspective view taken at circle 2B of FIG. 1A.
Figure 2C:
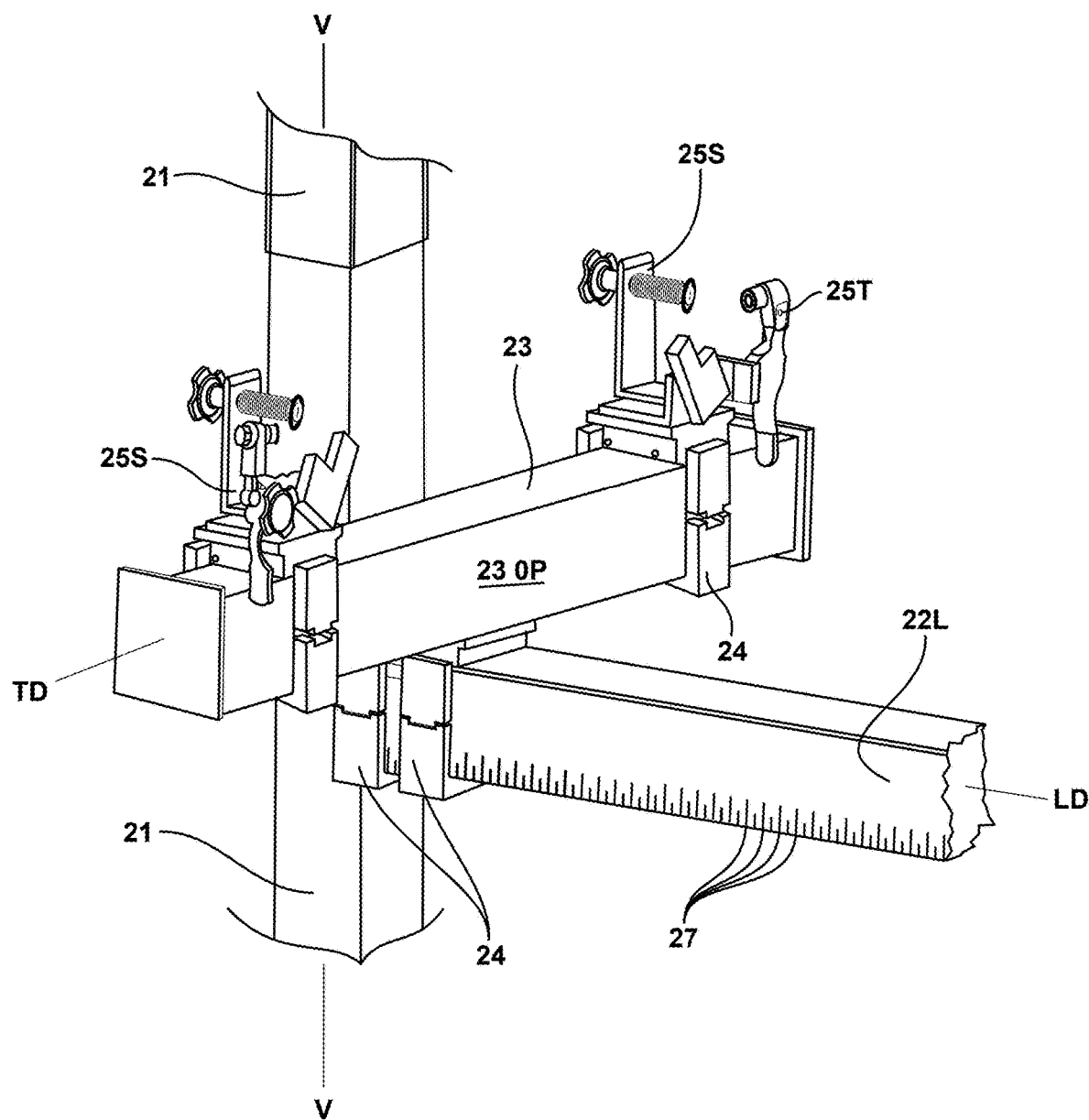
FIG. 2C is an enlarged fragmentary perspective view taken at circle 2C of FIG. 1A.

Referring to FIG. 2A, FIG. 2B and FIG. 2C and examining the invention in more detail, each of the spines 22U, 22L and each of the spreaders 23 preferably has one or more sliders 24 translatably disposed thereon. The sliders 24 bilaterally move in the longitudinal direction LD on a respective spine 22U, 22L to be fixedly disposed in a desired position thereon. Similarly the sliders 24 bilaterally move in the transverse direction TD on a respective spreader 23 to be fixedly disposed in a desired position thereon. The sliders 24 have a slider 24 inner 24IP and a slider 24 outer surface 24OP opposed thereto. The slider 24 may circumscribe the respective support bar as shown or may have a U-shaped cross-section. The slider 24 may be fixed in a desired position using a brake 30, as described below.

Each slider 24 has a fixture 25 mounted thereon. The fixture 25 removably holds the aircraft workpiece 60, or a portion thereof for maintenance. The fixture 25 may depend downwardly from the slider 24 to suspend the aircraft workpiece 60 or may extend upwardly from the slider 24 to support the aircraft workpiece 60.

Various embodiments of fixtures 25 are contemplated hereunder. For example, the fixture 25T may comprise a toggle clamp. The toggle clamp fixture 25T has opposed arms which reversibly come together to grip the aircraft workpiece 60. One arm may pivot towards and away from the other in response to operator manipulation of that arm or a handle associated with that arm. One or both arms may have adjustability to accommodate various thickness profiles of the aircraft workpiece 60. Another suitable fixture 25C may comprise a clevis. The clevis has opposed plates, with aligned holes therethrough. The aircraft workpiece 60 is interposed between the plates of the fixture 25C, so that a hole therethough is aligned with the holes of the plates. A pin, not shown, is inserted through the holes of the plates and of the aircraft workpiece 60 for proper retention during maintenance. In another embodiment the fixture 25S may comprise a screw clamp. The screw clamp advances a threaded fastener towards an opposing anvil to frictionally hold the aircraft workpiece 60 therebetween. The screw clamp fixture 25S and the toggle fixture 25T may be used in a single execution. In another embodiment, the fixture 25K may comprise a track. A complementary T shape may be attached to the aircraft workpiece 60 and the two tracks engaged in known fashion to hold the aircraft workpiece 60. In another embodiment, the fixture 25 may be directly attached to the spine 22U, 22L. In an alternative embodiment a single slider 24 may have two or more fixtures 25 thereon. In another alternative and modular embodiment the tracks 25K may be used to hold other fixtures including toggle clamp fixtures 25T, clevis fixtures 25C, screw clamp fixtures 25S, etc. which may be permanently or removably attached to the tracks 25K. Similarly, toggle clamp fixtures 25T, clevis fixtures 25C and screw clamp fixtures 25S may be attached to plural tracks 25K. Alternatively, the tracks 25K may be mounted directly to a spreader 23 or spine 22 without the use of an intermediate slider 24.

The uprights 21, spines 22U, 22L and/or spreaders 23 may further comprise visible indicia 27. The indicia 27 may comprise regular graduations for relative placement of the uprights 21, spines 22U, 22L and/or spreaders 23 relative to each other or absolute placement as predetermined for a particular aircraft workpiece 60. The indicia 27 may further comprise instructions for use, safety warnings, etc.

Figure 2D:
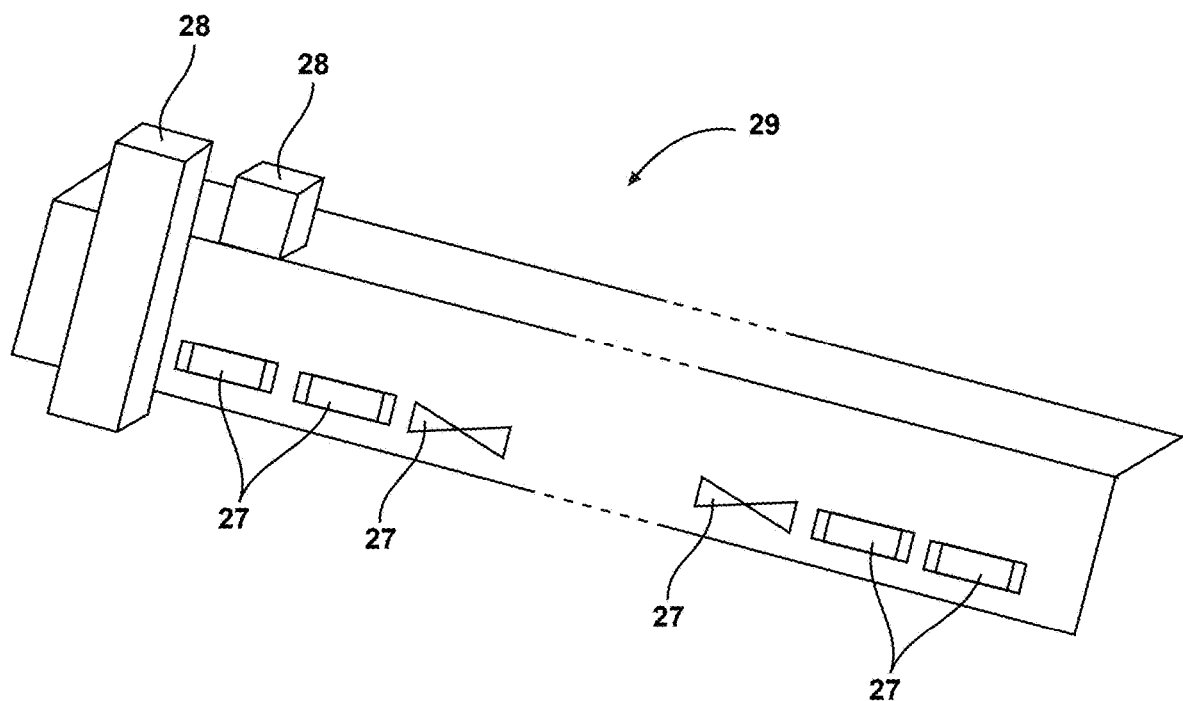
FIG. 2D is a perspective view of a removable cover usable with a spine or spreader of the present invention.

Referring to FIG. 2D, if desired the indicia 27 may be permanently disposed on a removable cover 29. The cover 29 may have an L-shaped cross section as shown, a U-shaped cross section or simply be a flat plate or flexible polymeric strip. The cover 29 may be made of aluminum, steel or polymeric materials and attached by clamps, magnets, a friction fit, etc. This cover 29 provides the benefit of a modular construction. A first cover 29 having first indicia 27 may be used for a particular task. The first cover 29 may be removed and replaced with a second cover 29 having second indica 27 as need for a second task, etc. The indica 27 on different covers 29 may read from left to right, right to left, from a centerline outward in both directions, have differing instructions for different tasks, comprise metric or English scales, index markings, etc. If desired, a rigid cover 29 may have one or more stops 28 thereon.

Figure 2E:
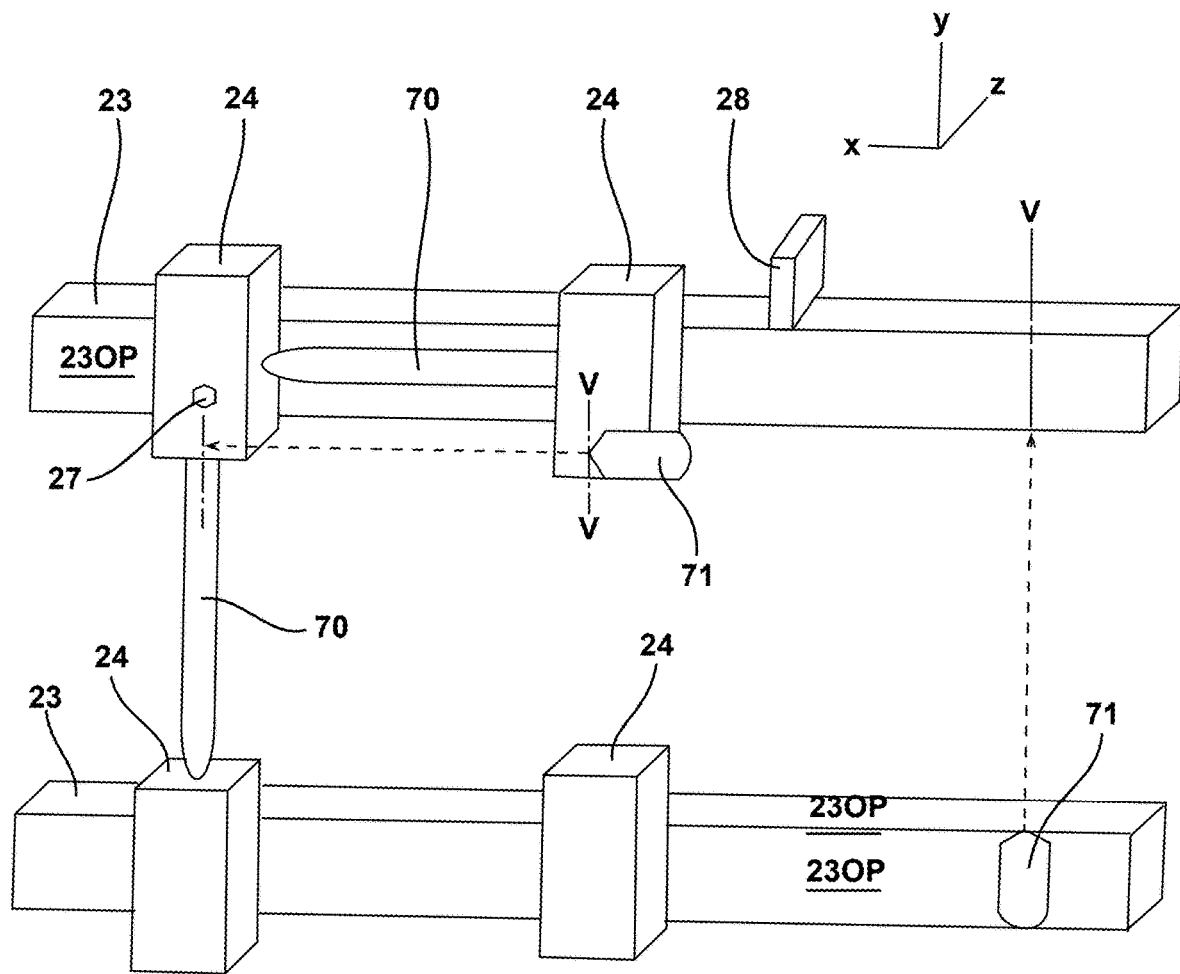
FIG. 2E is a schematic fragmentary perspective view of a system according to the present invention

Referring to FIG. 2E, if desired sliders 24 may be co-aligned or registered with other sliders 24 using registration aids. For example a spacer bar 70 having a predetermined length may be disposed between two sliders 70 to assure proper spacing therebetween. Likewise, a spacer bar 70 may be disposed between two spines 22U, 22L or between two spreaders 23 to assure proper spacing. Likewise, proper spacing may be achieved using a laser level tool 71 or laser 71 distance measuring tool 71 such as a BLAZE Model GLM100-23 laser measure available form Bosch USA of Mount Prospect, IL or a Model 48-22-9801 Laser Distance Meter available from Milwaukee Tool of Brookfield, WI. While vertical V and horizontal spacings are illustrated, one of skill will recognize the invention is not so limited and the spacer bar 70 or laser tool 71 may be used for diagonal and skewed measurements along or across any of the X, Y and Z axes.

Figure 3:
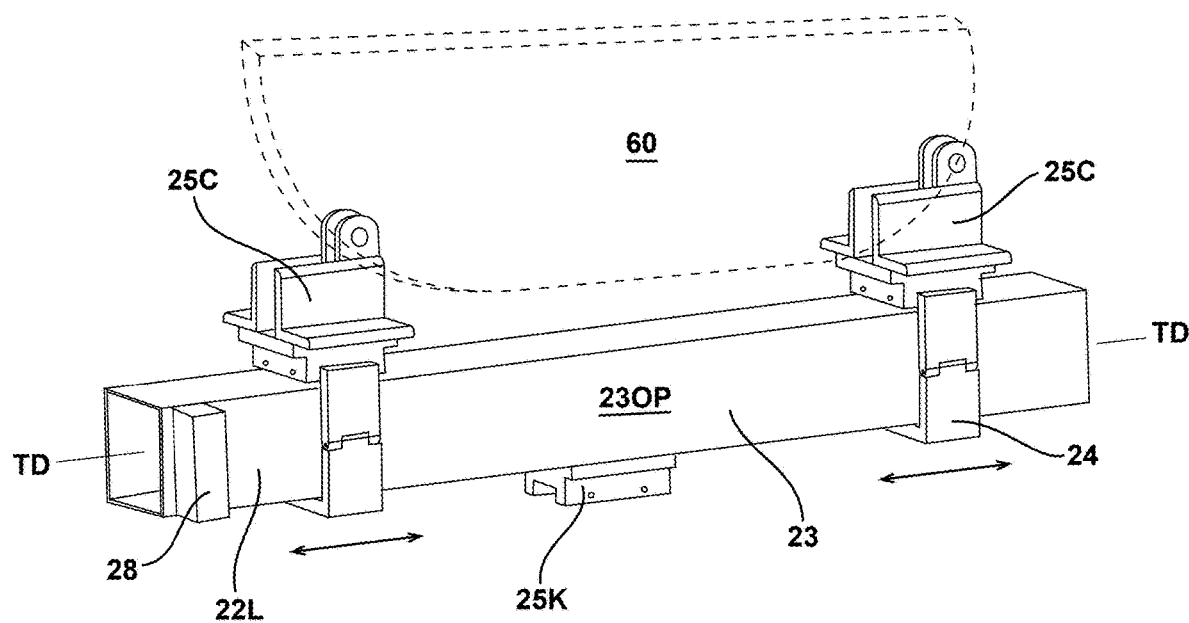
FIG. 3 is a fragmentary perspective view of a spreader having two sliders and a stationary fixture.

Referring to FIG. 3, two or more fixtures 25C may be used in combination to hold a single aircraft workpiece 60 or portion thereof. While two clevis fixtures 25C are shown, one of skill will recognize the invention is not so limited. Any combination of various toggle fixtures 25T, clevis fixtures 25C, screw clamp fixtures 25S and/or track fixtures 25K may be used as needed. The sliders 24 may be placed in desired positions, as needed to juxtapose the fixtures 25 with the complimentary portions of the aircraft workpiece 60.

Figure 4:
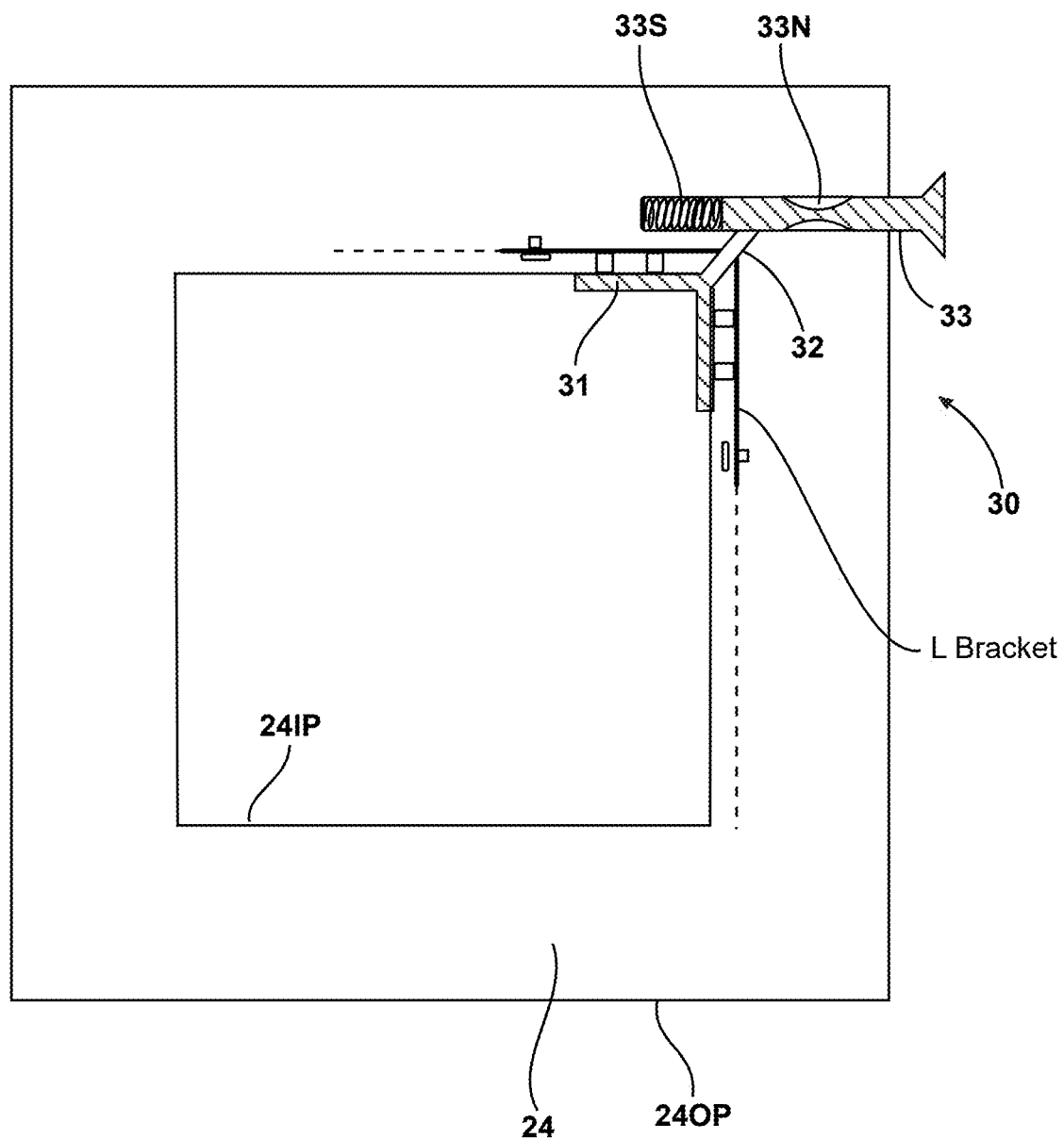
FIG. 4 is a front elevational view of a slider having a brake.

Referring to FIG. 4, the slider 24 may be used in combination with the spine 22 and or spreader 23 and a brake 30 to hold the slider 24 in position on the respective spine or spreader 23. The following discussion is with respect to a brake 30 for a slider 24 on a spreader 23, but also applies to a brake 30 for slider 24 disposed on a spine 22. The brake 30 may circumscribe the spreader 23 and be congruent therewith. Or the brake may have a brake pad 31 with one or more legs which intercept the outer surface of the respective support bar 200. The inner surface of the brake pad 31 may be juxtaposed with or in contacting relationship with the outer surface of the 24OP of the slider 24.

When the brake 30 is not engaged, the slider 24 is translatably disposed on the spreader 23 for movement to a desired position. When the brake 30 is engaged the slider 24, and associated, corresponding fixture 25 are held in position for an operator to dispose the aircraft workpiece 60 on that fixture 25 for maintenance and remove the aircraft workpiece 60 therefrom for replacement on the aircraft.

The slider 24 has an inner surface 24IP and an outer surface 24OP define a wall having a wall thickness therebetween. The wall thickness is taken perpendicular to the inner surface 24IP and outer surface 24OP. The brake 30 comprises a brake pad 31 which is preferably congruent with the outer surface 23OP of the spreader 23 and a locking mechanism. The locking mechanism allows an operator to engage and disengage the brake 30 from outside of the slider 24 and in a safe and ergonomic position.

In one embodiment the locking mechanism comprises an elongate driver pin 32 which engages the brake pad 31 and urges the brake pad 31 into frictional engagement with the slider 24 outer surface 23OP. The driver pin 32 has a first end which contacts the brake pad 31 and a second end opposed to and outwardly disposed therefrom. The second end of the key pin 33 is grasped by the user for insertion and retraction and may have an enlarged head for ergonomics. The driver pin 32 may be oriented approximately 45 degrees to the wall of the support bar 200 so that mutually perpendicular legs of the brake pad 31 intercept respective surfaces of the support bar. The legs of the brake pad 31 preferably meet at a vertex juxtaposed with the second end of the driver pin. The legs of the brake pad 31 preferably do not extend throughout the entire wall in order to minimize drag while moving the slider 24.

The driver pin 32 is actuated, in turn, by an elongate key pin 33. The key pin 33 is disposed in an elongate hollow port and has a first end juxtaposed with the driver pin 32 and a second end opposed thereto and outwardly disposed therefrom. The key pin 33, and particularly the second end thereof, extends outwardly of the slider 24 outer surface 24OP for grasping and actuation by an operator. The key pin 33 is preferably outwardly biased by a spring 33S, to allow for disengagement.

The key pin 33 preferably has at least one notch 33N to allow for retraction of the second end of the driver pin 32 therein. Retraction of the driver pin 32 into the notch 33N of the key pin 33 releases the brake pad 31 and disengages the brake 30 to allow for further movement of the slider 24. When the second end of the driver pin 32 is not disposed the notch 33N, the driver pin 32 is pushed forwardly and inwardly to press the brake pad 31 against the spreader 23 outer surface 23OP. While an embodiment with a single brake pad 31 in one corner is shown, one of skill will recognize the invention is not so limited.

The key pin 33 may be tapered, so that as the key pin 33 is pushed inwardly by the operator, the driver pin 32, in turn, is further urged against the brake pad 31, to increase the frictional engagement. The slider 24 may comprise plural brakes 30, particularly two brake pads 31 disposed in diagonally opposite corners.

Figure 5:
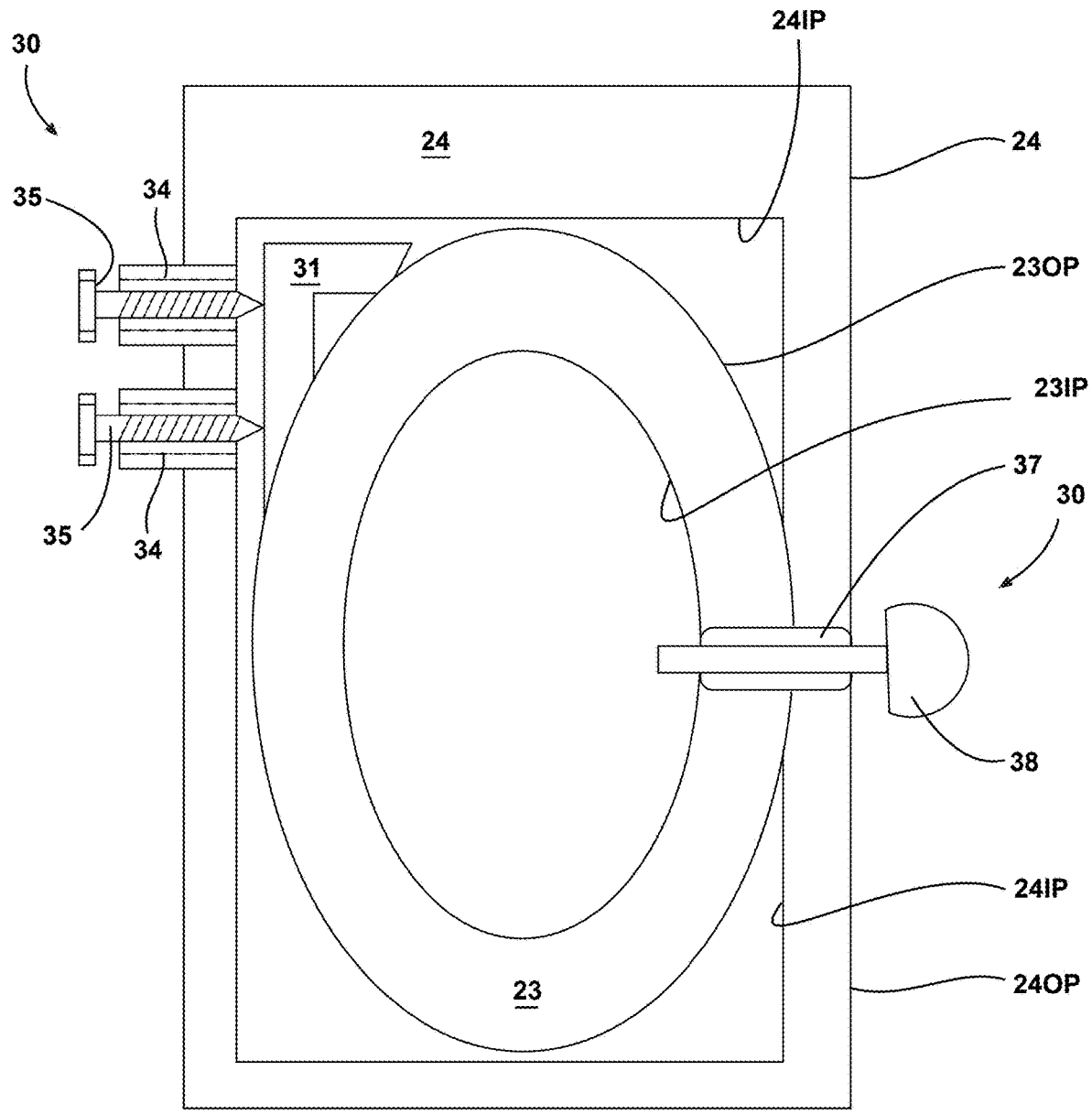
FIG. 5 is a front elevational view of an alternative embodiment of a spreader having an oval cross section, with a slider having an alternative brake.

Referring to FIG. 5, in an alternative embodiment the slider 24 need not be congruent with the spreader 23. This embodiment or the previous embodiment, may utilize a different locking mechanism for the brake 30. For example, the locking mechanism may comprise an internally threaded hole 34 extending through the wall of the slider 24. An externally threaded fastener 35 is threadably engaged with the hole 34. The threaded fastener 35 may have a proximal end hex head as is known in the art. The hex head is disposed outwardly of the slider 24 outer surface 24OP for actuation by the operator. The distal end of the threaded fastener 35 engages the brake 30 to urge the brake pad 31 against the outer surface 23OP of the spreader 23. Reversal of the threaded fastener 35 disengages the brake pad 31 from the spreader 23.

This arrangement provides the benefit over the prior art that the threaded fastener 35 does not directly contact the support bar 200, and cause damage due to undue pressure from the distal end of the threaded fastener 35. The threaded fasteners(s) 35 urge the brake pad 31 against the support bar 200 with sufficient force to lock the slider 24 in place yet the pressure is not so great as to damage the support bar 200, cover 29 or indicia 27 thereon.

In another embodiment, the locking mechanism may comprise registered index holes 37 and a lock pin 38. In this embodiment the spreader 23 may have plural equally or unequally transversely spaced index holes 37 therethrough. The slider 24 may have a complementary hole 37 therethrough. The slider 24 is disposed in a desired position, so that the holes 37 are registered. The lock pin 38 is inserted through spreader 23 and slider 24, preventing movement of the slider 24 until the lock pin 38 is removed. If the holes 37 and lock pin 38 have some clearance there between, this brake 30 may be used as a coarse adjustment for the position of the brake 30 and the threaded fasteners 35 may be used as the fine adjustment for the position of the brake 31 and corresponding slider 24. The amount of coarse adjustment is based upon the amount of movement of the slider 24 on the respective support bar 200 along the axis of that support bar 200 due to the difference in OD of the lock pin 38 and the ID of the hole 37.

It can be seen that the slider 24 is not limited to a single brake 31. The slider 24 may have plural brakes 31, as helpful to lock the slider 24 in place when dealing with heavy or awkward aircraft workpieces 60. The plural brakes 31 may be oppositely disposed as shown for stability.

Figure 6A:
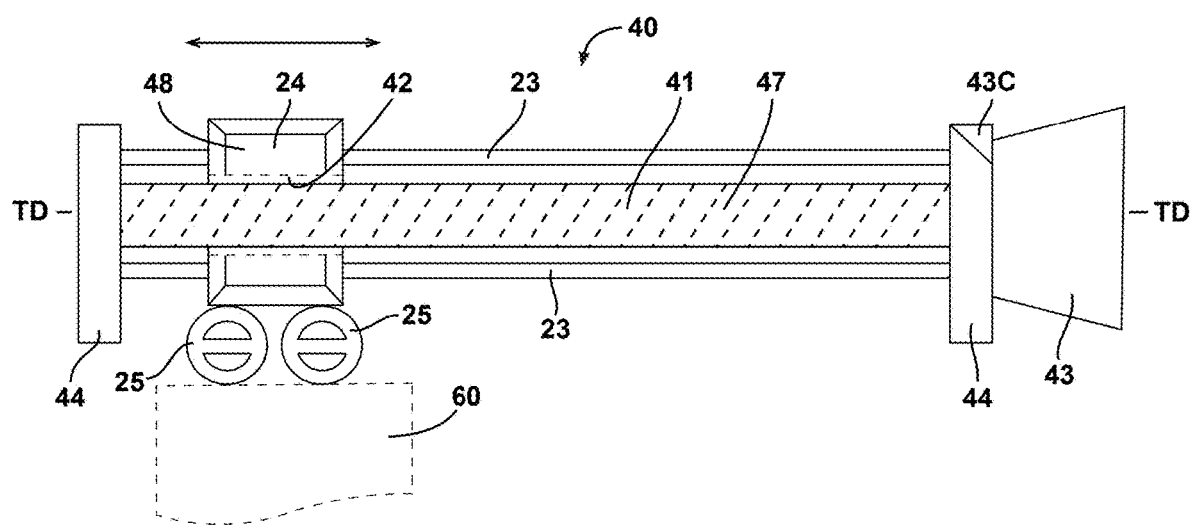
FIG. 6A is a schematic side elevational view of an alternative embodiment of a spreader having a precision drive system.

Referring to FIG. 6A, the slider 24, in combination with the spreader 23, may have a precision drive system 40. The precision drive system 40 provides for precise placement of the slider 24 along the support bar 200. By precision placement it is meant that the fixture 25 joined to the slider 24 can be placed within 0.001 and preferably within 0.0001 inches of a desired location by movement of the slider 24 in the respective X, Y or Z direction. The precision drive system 40 is preferably electrically powered as is known in the art.

The precision drive system 40 may comprise a motor 43 operably connected to a jack screw 41 in known fashion. The jack screw 41 may be parallel to the transverse direction TD and endwise mounted on transversely opposed fix end supports 44. The slider 24 may have an internally threaded nut 42 threadably engaged with the jack screw 41. Motor 43 driven axial rotation of the jack screw 41 responsively causes precise translation of the slider 24 in the transverse direction TD. The fixture 25, in turn is joined to the slider 24 and ultimately and precisely disposed in the desired and predetermined position.

Figure 6B:
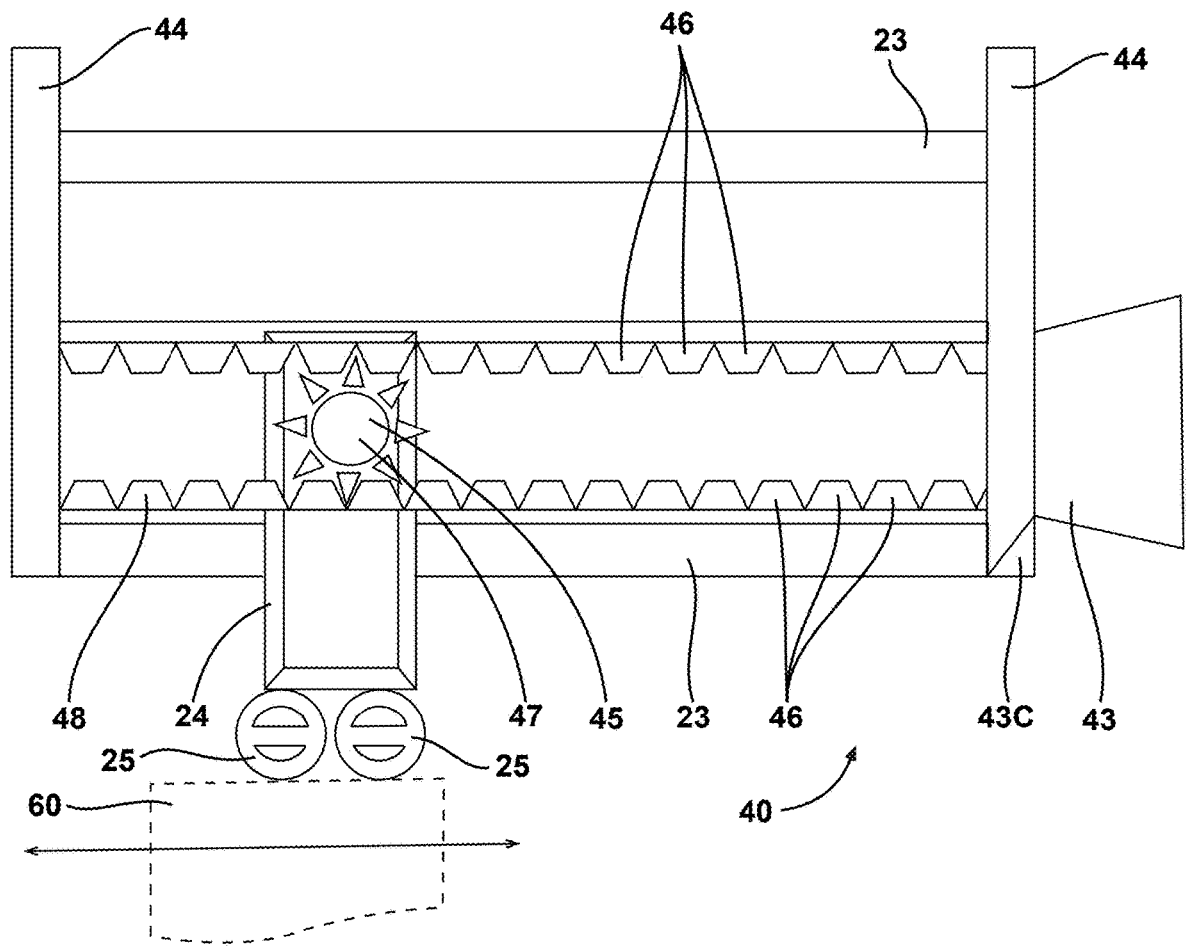
FIG. 6B is a schematic side elevational view of another alternative embodiment of a spreader having a precision drive system.

Referring to FIG. 6B, in an alternative embodiment the precision drive 40 may comprise a rack 46 and pinion gear 45. The rack 46 may be disposed parallel to the support bar 200. The pinion gear 45 is operably connected to and axially rotated by a motor 43. The slider 24, in turn, is connected to the pinion gear and moves responsive to being driven by the motor. The fixture 25, in turn is joined to the slider 24 and ultimately and precisely disposed in the desired and predetermined position.

The jack screw 41 and rack 46 may be generally referred to as longitudinal and axially rotatable rotating drive members 47 with a respective nut 42 or pinion gear 45 acting as non-rotatable driven members 48. Relative movement between the rotating drive member 47 and the complementary respective driven member 48 causes responsive translation of the slider 24 and associated fixture 25 to a desired position based upon an indicium 27 or other maintenance needs. The jack screw 41 embodiment provides the benefit of axial rotation parallel to the support bar 200, potentially reducing footprint with the motor 43 and particularly the rotating drive member 47 thereof co-linear with the jack screw 41 such that the motor axis is colinear with the transverse direction TD. The pinion gear 45 embodiment provides the benefit of axial rotation perpendicular to the support bar 200, potentially allowing for drive on either side thereof.

The precision drive system 40 may be programmed, operated, started and stopped in known fashion by a microcontroller 43C integrated therewith or manually actuated by an operator. The microcontroller 43C may be programmed to count pulses in a stepper motor 43, may register the fixture 25 with a particular indicium 27 or index to a particular position, e.g. from a first known or desired position to a second known or desired position. The microcontroller 43C may be pre-programed or operate upon command form an operator. Alternatively, the jack screw 41 or pinion gear 45 may be manually operated. Either precision drive system 40 may function as a brake 30 by locking the nut 42 in position with the jack screw 41 or locking the pinion gear 45 in position with the rack 46.

Figure 7:
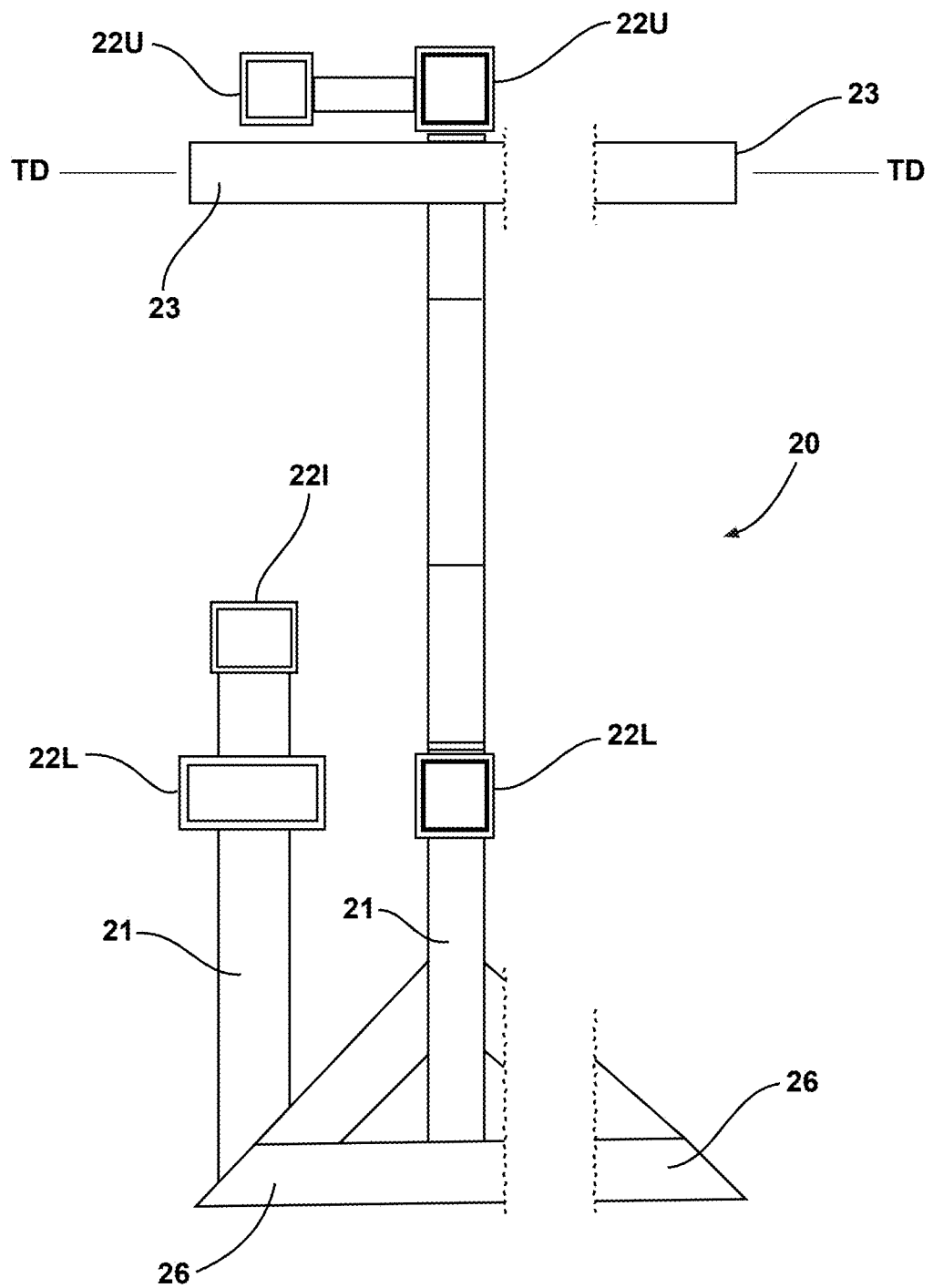
FIG. 7 is a side elevational view of an alternative embodiment of a stand having an indeterminate transverse dimension and plural upper and lower spines.

Referring to FIG. 7, in an alternative embodiment the stand 20 may have vertically offset upper spine 22U and lower spine 22L assemblies. This arrangement provides the benefit that an unusually shaped aircraft workpiece 60 may be held by the stand 20 without jeopardizing the center of gravity and potential tipping.

Furthermore, depending upon the configuration of the workpiece 60 the stand 20 may have plural lower spines 22L, plural upper spines 22U and/or an intermediate spine 22I. This arrangement provides the benefit that heavier or larger parts can be accommodated by the stand 20 for maintenance.

Figure 8:
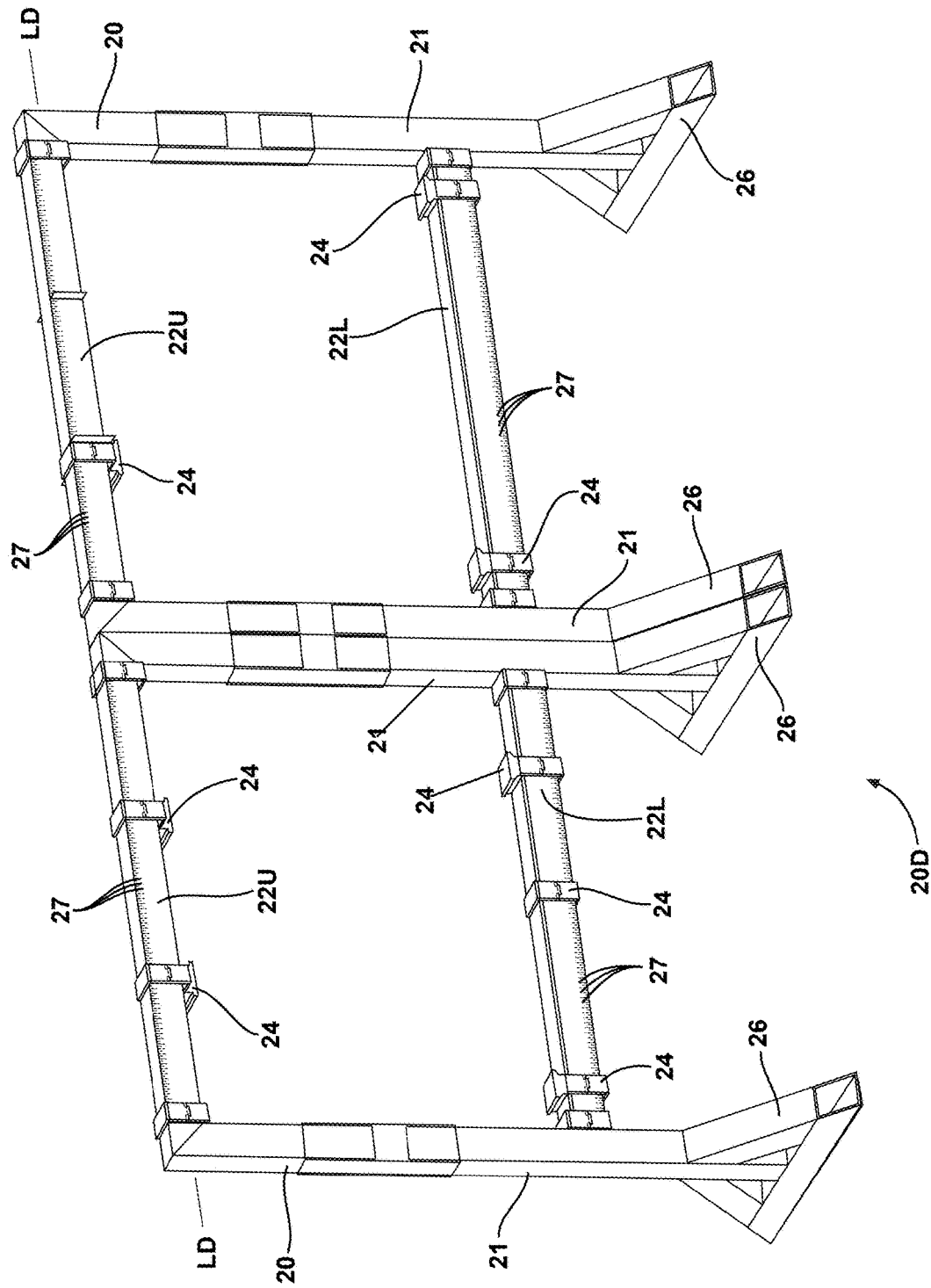
FIG. 8 is a perspective view of an alternative embodiment of a double stand comprising two individual stands in series.

Referring to FIG. 8, in a modular embodiment, two stands 20D may be placed in series. This arrangement provides the benefit that longer aircraft workpieces 60 may be accommodated.

Figure 9:
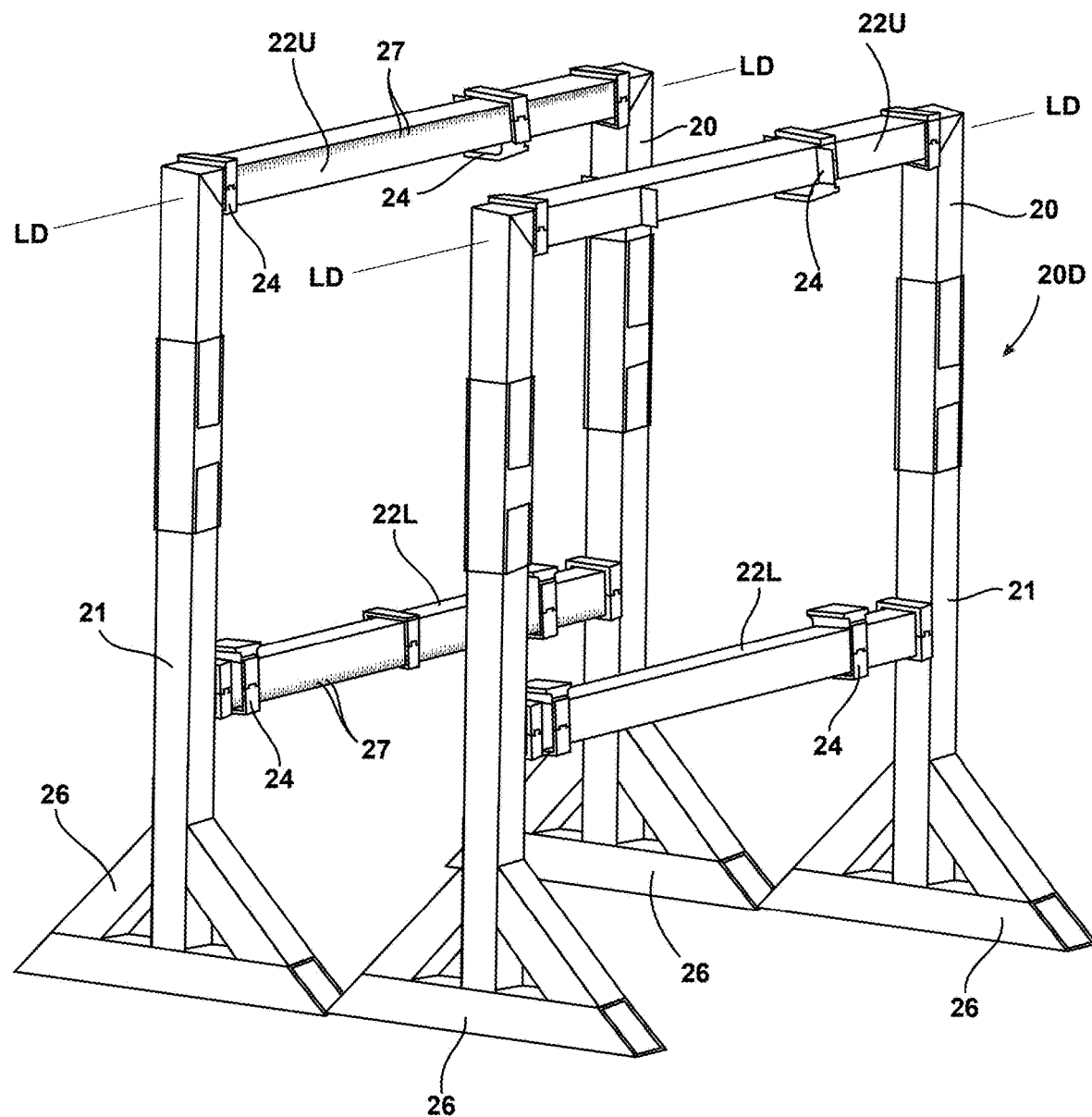
FIG. 9 is a perspective view of an alternative embodiment of a double stand comprising two individual stands in parallel.

Referring to FIG. 9, in another modular embodiment, two stands 20D may be placed in parallel. This arrangement provides the benefit that heavier aircraft workpieces 60 may be accommodated as the weight is divided among more uprights 21.

Figure 10A:
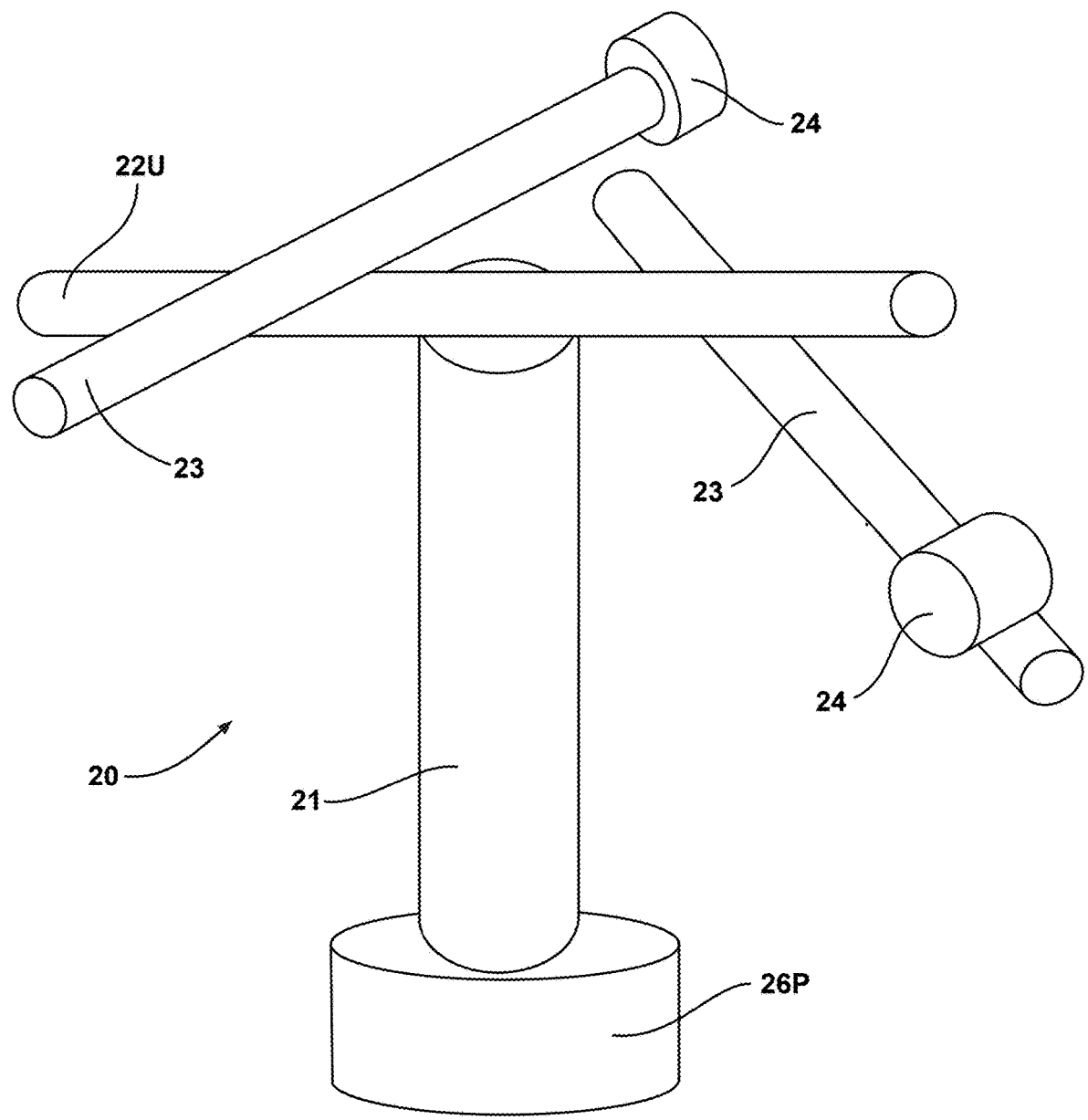
FIG. 10A is a schematic perspective view of an alternative embodiment of a stand having a pedestal upright, round spine and round spreaders.

Referring to FIG. 10A and FIG. 10B, in another alternative embodiment a single upright 21 may be used with a pedestal base 26P. This arrangement provides the benefit that a single upright 21 may be used to conserve space.

Furthermore, the spine 22U, 22L and/or spreader 23 may have a round cross section. This arrangement provides the benefit that the spreader 23 and/or slider 24 may rotate about the spine 22U, 22L and/or spreader 23, respectively. The stand 20 with infinite X, Y Z adjustability now also has X and Z axis rotation.

Referring to FIG. 11, in another embodiment the spreader 23 may be curvilinear. This arrangement provides the benefit that the fixture 25 may angularly disposed in a desired orientation. One of skill will recognize that the cross section of the spreader 23 may be round to provide for rotation about the Z axis. Similarly the upper spine 22U or lower spine 22L may be curvilinear in the direction of the X axis and likewise have a round cross section.

Referring to FIG. 12, in an alternative embodiment, the slider 24 may have one or more index holes 37 and the spreader 23 may have one or more index holes 37. The slider 24 is registered so that the index holes 37 are aligned. A lock pin 38 is then inserted through the aligned index holes 37 to hold the slider 24 in place. This embodiment provides the benefit that the slider 24 may be quickly moved from one position to another to rapidly carry out maintenance on various aircraft workpieces 60.

Figure 13:
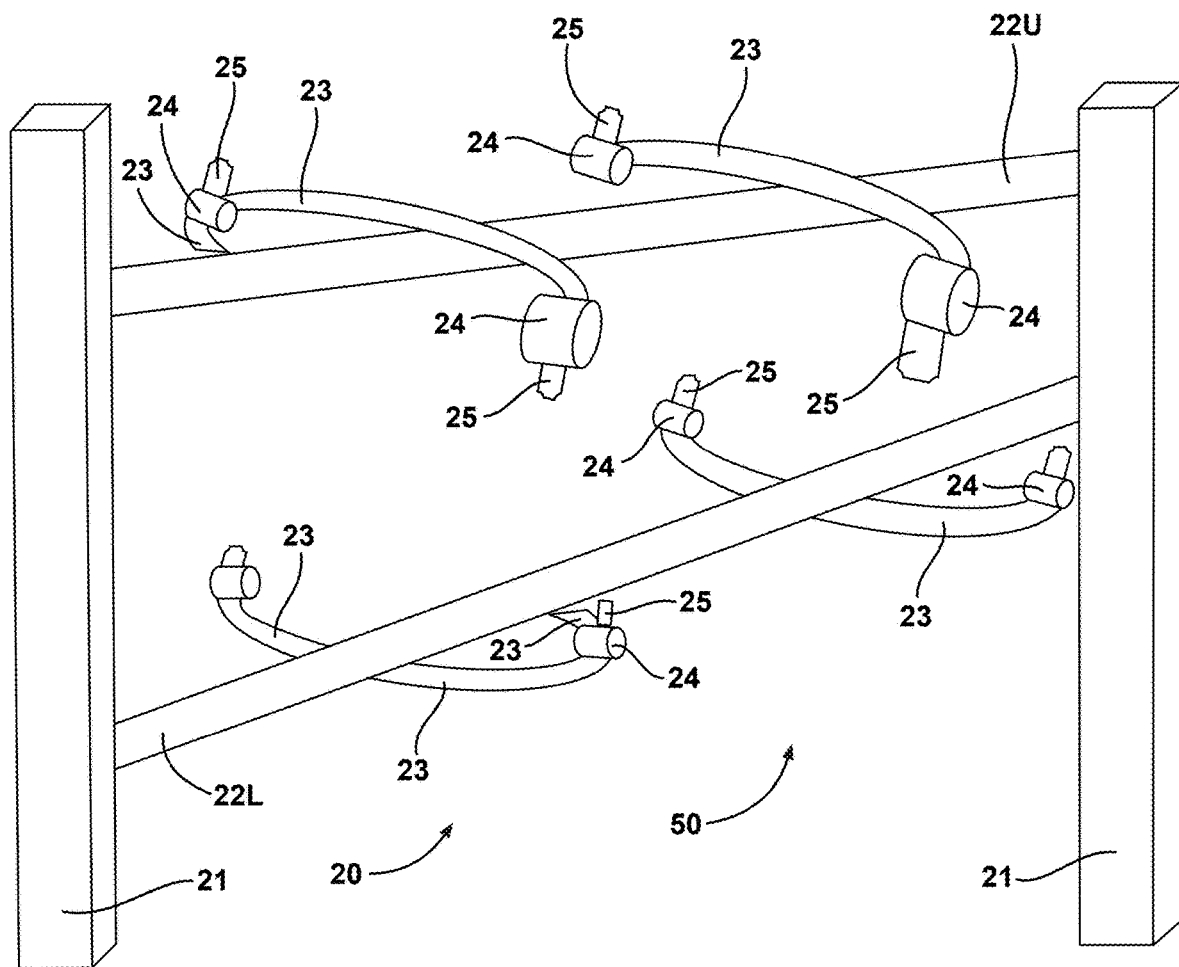
FIG. 13 is a schematic perspective view of an alternative embodiment of a stand having skewed spines and a kit of spreaders.

Referring to FIG. 13, in another embodiment, a kit 50 may be used to expedite maintenance of common parts. The kit 50 may comprise a plurality of spreaders 23 having sliders 24 predisposed thereon in the position needed for that maintenance. The spreaders 23 in such a kit 50 may be alike or different. I.e. the mutually different spreaders 23 may have different lengths, different sliders 24 in different positions, etc. One of skill will recognize the benefit of having plural kits 50 for commonly used aircraft workpieces 60. This arrangement providers the benefit of reduced setup time for common maintenance procedures. One exemplary kit 50 may have two concave upward curvilinear spreaders 23 disposed on the lower spine 22L and two concave downward curvilinear spreaders 23 disposed on the upper spine 22U.

All values disclosed herein are not strictly limited to the exact numerical values recited. Unless otherwise specified, each such dimension is intended to mean both the recited value and a functionally equivalent range surrounding that value. For example, a dimension disclosed as "40 mm" is intended to mean "about 40 mm." The term "or" as used herein is to be interpreted as an inclusive or meaning any one or any combination. Therefore, "A, B or C" means "any of the following: A; B; C; A and B; A and C; B and C; A, B and C." Every document cited herein, including any cross referenced or related patent or application, is hereby incorporated herein by reference in its entirety unless expressly excluded or otherwise limited. The citation of any document or commercially available component is not an admission that such document or component is prior art with respect to any invention disclosed or claimed herein or that alone, or in any combination with any other document or component, teaches, suggests or discloses any such invention. Further, to the extent that any meaning or definition of a term in this document conflicts with any meaning or definition of the same term in a document incorporated by reference, the meaning or definition assigned to that term in this document shall govern according to *Phillips v. AWH Corp.*, 415 F.3d 1303 (Fed. Cir. 2005). All limits shown herein as defining a range may be used with any other limit defining a range of that same parameter. That is the upper limit of one range may be used with the lower limit of another range for the same parameter, and vice versa. As used herein, when two components are joined or connected the components may be interchangeably contiguously joined together or connected with an intervening element therebetween. A component joined to the distal end of another component may be juxtaposed with or joined at the distal end thereof. While particular embodiments of the present invention have been illustrated and described, it would be obvious to those skilled in the art that various other changes and modifications can be made without departing from the spirit and scope of the invention and that various embodiments described herein may be used in any combination or combinations. It is therefore intended the appended claims cover all such changes and modifications that are within the scope of this invention.

What is claimed is:

1. A stand for holding at least one aircraft workpiece during maintenance, the stand defining mutually perpendicular vertical, longitudinal and transverse axes, defining vertical, longitudinal and transverse directions, respectfully and comprising:
    a stationary pair of longitudinally spaced apart uprights;
    a first elongate, longitudinally oriented, vertically placeable spine having a round cross section and operably connecting the pair of uprights;
    an elongate, transversely oriented, longitudinally placeable first spine spreader having a round cross section and being rotatably and translatably disposed on the first spine;
    at least one transversely placeable slider, the slider being rotatably and translatably disposed on the first spine spreader; and
    each slider having at least one respective fixture disposed thereon, each at least one fixture being adapted to removably hold a workpiece in fixed relationship relative to an operator, wherein each respective at least one fixture can be translatably adjusted in the vertical direction, longitudinal direction and transverse direction and rotatably adjusted about the longitudinal axis and about the transvers axis as needed to hold the workpiece.

2. The stand according to claim 1 further comprising a second longitudinally oriented spine operably connecting the pair of uprights, the second spine being parallel to and vertically spaced apart from the first spine.

3. The stand according to claim 2 further comprising at least one elongate, transversely oriented, longitudinally placeable second spine spreader translatably disposed on the second spine;
- a second transversely placeable slider translatably disposed on the second spine spreader; and
- a second respective fixture disposed on the second slider on the second spine spreader, the second fixture being adapted to hold the workpiece in fixed relationship relative to the operator.

4. The stand according to claim 3 wherein the first spine spreader and the second spine spreader are disposed perpendicular to the first spine and the second spine, respectively.

5. The stand according to claim 4 wherein the uprights are vertical and the first spine spreader and the second spine spreader are disposed perpendicular to the uprights.

6. A stand for holding at least one aircraft workpiece during maintenance, the stand defining a longitudinal direction, a transverse direction perpendicular thereto and comprising:
- a pair of longitudinally spaced apart uprights;
- an upper elongate, longitudinally oriented, vertically placeable spine operably connecting the pair of uprights;
- a lower elongate, longitudinally oriented, vertically placeable spine therebeneath and operably connecting the pair of uprights;
- a first elongate, transversely oriented, longitudinally placeable upper spine spreader translatably disposed on the upper spine;
- an upper transversely placeable slider translatably disposed on the upper spine spreader;
- a first elongate, transversely oriented, longitudinally placeable lower spine spreader translatably disposed on the lower spine;
- a lower transversely placeable slider translatably disposed on the lower spine spreader,
- the upper slider and the lower slider having at least one respective fixture disposed thereon, each at least one fixture being adapted to removably hold a workpiece in fixed relationship relative to an operator and
- further comprising:
- a second elongate, transversely oriented, longitudinally placeable upper spine spreader translatably disposed on the upper spine and being longitudinally spaced apart from the first upper spine spreader;
- a second elongate, transversely oriented, longitudinally placeable lower spine spreader translatably disposed on the lower spine and being longitudinally spaced apart from the first lower spine spreader;
- each of the first and second upper spine spreader and each of the first and second lower spine spreader having respective first and second transversely opposed ends, whereby each first end is disposed on a first side of the respective spine and each second end is oppositely disposed on a second side of the spine, wherein the upper and lower sliders each comprise a plurality of sliders, each of the first and second ends of each of the first and second upper spine spreaders are juxtaposed with a respective one of the plurality of upper sliders, and each of the first and second ends of each of the first and second lower spine spreaders are juxtaposed with a respective one of the plurality of lower sliders.

7. The stand according to claim 6 wherein the upper spine and the lower spine are vertically stacked.

8. The stand according to claim 7 wherein each of the plurality of upper and lower sliders further comprises a brake adapted to lock each respective slider in a predetermined position on the respective spreader, so that each of the plurality of upper and lower sliders is a brakable slider.

9. The stand according to claim 8 wherein each spine spreader has an outer surface and the brake has an inner surface congruent thereto; the brake comprising: a brake pad releasably engageable with one of the respective lower spine spreader or respective upper spine spreader, thereby yielding a brakable slider, and disposed internal to the brakable slider; a driver pin connected to the brake pad and being operable by an operator to engage and disengage the brake pad from the outer surface of the spreader.

10. The stand according to claim 9 further comprising a key pin operably connected to the driver pin, the key pin extending outwardly through the slider and being retractable to disengage the brake pad from the respective upper or lower spine spreader and insertable to engage the brake pad with said spreader.

11. The stand according to claim 10 wherein the key pin is tapered and threadably associated with the slider.

12. A stand for holding at least one aircraft workpiece during maintenance, the stand defining a longitudinal direction, a transverse direction perpendicular thereto and comprising:
- a pair of longitudinally spaced apart uprights;
- an upper elongate, longitudinally oriented, vertically placeable spine operably connecting the pair of uprights;
- a lower elongate, longitudinally oriented, vertically placeable spine beneath the upper spine and operably connecting the pair of uprights;
- a first elongate, transversely oriented, longitudinally placeable upper spine spreader translatably disposed on the upper spine;
- an upper transversely placeable slider translatably disposed on the upper spine spreader;
- a first elongate, transversely oriented, longitudinally placeable lower spine spreader translatably disposed on the lower spine;
- a lower transversely placeable slider translatably disposed on the lower spine spreader;
- each of the upper and lower sliders having at least one respective fixture disposed thereon, each at least one fixture being adapted to hold a workpiece in fixed relationship relative to an operator; and
- a precision drive operably associated with the upper slider or the lower slider, the precision drive translating the respective slider along the spreader in response to commands from an operator.

13. The stand according to claim 12 wherein at least one of the pair of uprights, the upper spine, the lower spine, the upper spine spreader and the lower spine spreader has a round cross section to allow rotation thereabout.

14. The stand according to claim 12 wherein the precision drive comprises an externally threaded jack screw operably coupled to an electric motor and the respective upper slider or lower slider comprises a corresponding internally threaded nut threadably engaged therewith, whereby rotation of the jack screw in response to actuation by the motor translates the respective upper slider or lower slider along the spreader.

15. The stand according to claim 14 wherein the nut is integral with the respective upper slider or lower slider.

16. The stand according to claim 14 wherein the jack screw and the respective upper slider or lower slider are mutually parallel.

17. The stand according to claim 16 wherein the electric motor is a bidirectional motor providing the respective upper slider or lower slider a placement resolution of not more than 0.0001 inches.

\* \* \* \* \*